United States Patent
Zhang et al.

(10) Patent No.: US 9,372,954 B2
(45) Date of Patent: Jun. 21, 2016

(54) SEMICONDUCTOR DEVICE DESIGN SYSTEM AND METHOD

(71) Applicant: TAIWAN SEMICONDUCTOR MANUFACTURING COMPANY, LTD., Hsinchu (TW)

(72) Inventors: Ya-Min Zhang, Shanghai (CN); Mu-Jen Huang, Taipei (TW); Ming Feng, Shanghai (CN); Peng-Sheng Chen, Shanghai (CN)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/278,409

(22) Filed: May 15, 2014

(65) Prior Publication Data

US 2015/0227672 A1 Aug. 13, 2015

(30) Foreign Application Priority Data

Feb. 12, 2014 (CN) .......................... 2014 1 0048938

(51) Int. Cl.
*G06F 9/455* (2006.01)
*G06F 17/50* (2006.01)

(52) U.S. Cl.
CPC .................................. *G06F 17/5081* (2013.01)

(58) Field of Classification Search
USPC ................................................ 716/111, 112
See application file for complete search history.

(56) References Cited

U.S. PATENT DOCUMENTS

| 7,284,231 | B2 | 10/2007 | Lucas et al. | |
|---|---|---|---|---|
| 7,567,947 | B2 | 7/2009 | Balog | |
| 2003/0182643 | A1* | 9/2003 | Crouse et al. | 716/5 |
| 2004/0117374 | A1 | 6/2004 | Hung et al. | |
| 2009/0187867 | A1* | 7/2009 | Lawrence | 716/4 |
| 2013/0326446 | A1* | 12/2013 | Reber et al. | 716/112 |

FOREIGN PATENT DOCUMENTS

| TW | 569295 | 1/2004 |
|---|---|---|
| TW | 200411509 | 7/2004 |
| TW | 200630835 | 9/2006 |

(Continued)

OTHER PUBLICATIONS

Office Action dated Nov. 2, 2015 from corresponding No. TW 103145947.

(Continued)

*Primary Examiner* — Brian Ngo
(74) *Attorney, Agent, or Firm* — Hauptman Ham LLP

(57) ABSTRACT

A system and method of designing a semiconductor device comprising loading a design rule manual (DRM) and a design rule check (DRC) into an electronic design tool, wherein the DRM comprises one or more design rules and the DRC comprises one or more design rule checks. Each design rule check is both associated with a corresponding design rule and configured to verify compliance with the corresponding design rule. The method further includes receiving a relevant information, wherein the relevant information comprises a layer number or a selected feature of the semiconductor device, creating, by a processor, a condensed DRM from the DRM, a condensed DRC from the DRC and displaying at least the condensed DRM or condensed DRC by a user interface. The condensed DRM is a portion of the DRM and the condensed DRC is a portion of the DRC.

20 Claims, 7 Drawing Sheets

(56) References Cited

FOREIGN PATENT DOCUMENTS

| | | |
|---|---|---|
| TW | 201339877 | 10/2013 |
| TW | 201351175 | 12/2013 |

OTHER PUBLICATIONS

Notice of Allowance dated Apr. 29, 2016 from corresponding No. TW 104108133.

* cited by examiner

SEMICONDUCTOR DEVICE DESIGN SYSTEM AND METHOD

PRIORITY CLAIM

The present application claims priority to Chinese Application No. 201410048938.0, filed Feb. 12, 2014, which is incorporated by reference herein in its entirety.

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications. Various electronic design automation (EDA) tools are developed to generate, optimize and verify designs for semiconductor devices while ensuring that the design and manufacturing specifications are met.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
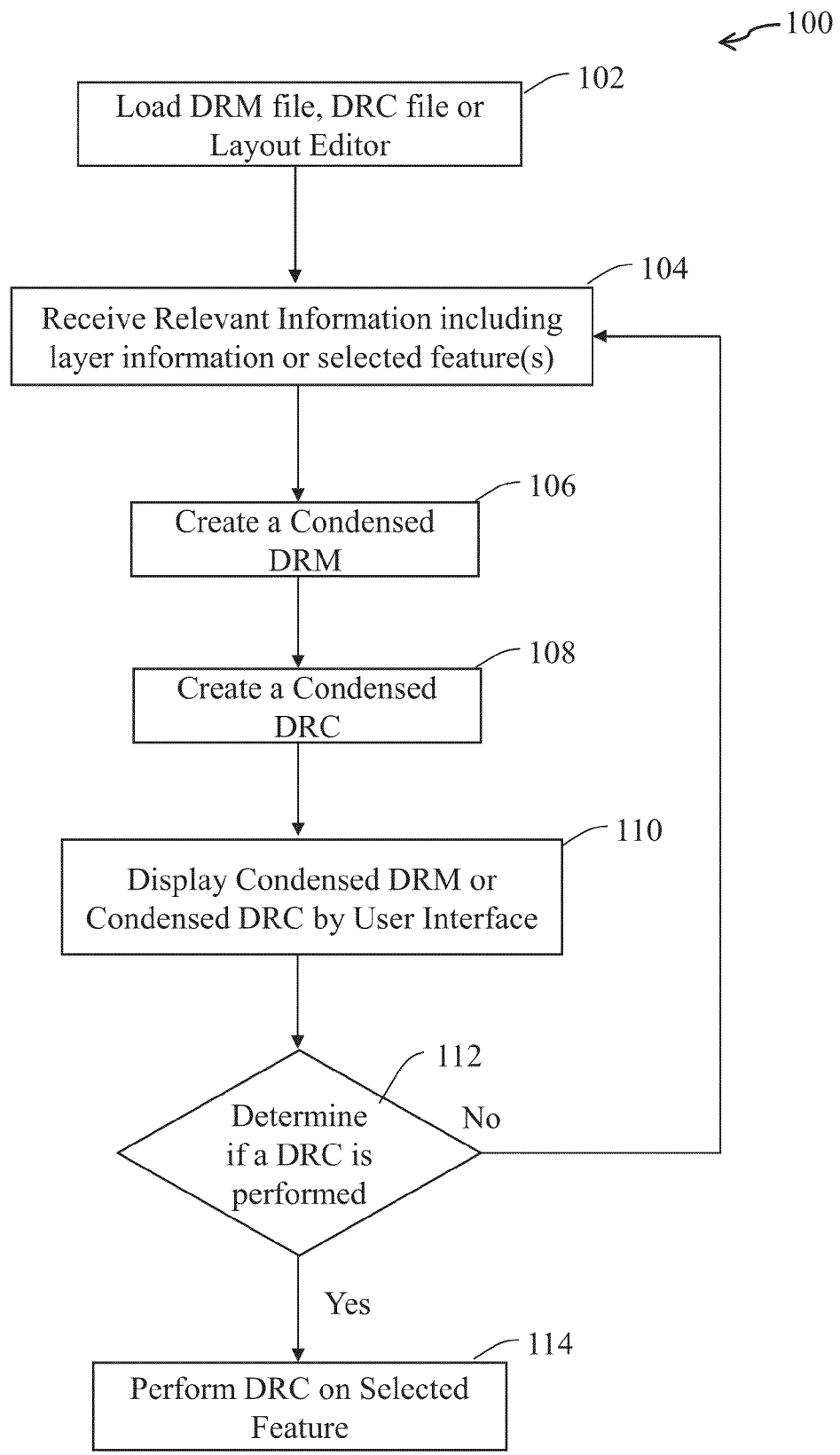
FIG. 1 is a flow chart of a method of designing a semiconductor device in accordance with one or more embodiments.

The following disclosure provides many different embodiments, or examples, for implementing different features of the disclosed subject matter. Specific examples of components and arrangements are described below to simplify the present disclosure. These are examples and are not intended to be limiting.

This description of the embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise.

As semiconductor devices and integrated circuits (IC) have become smaller and more complex, IC designers use electronic design automation (EDA) software tools to design integrated circuits. Typically, the integrated circuit design process begins with a specification, which describes the functionality of the integrated circuit and may include a variety of performance requirements. Then, during a logic design phase, the logical implementation of the IC functionality is described using one of several hardware description languages, such as Verilog or VHDL, at the register transfer logic (RTL) level of abstraction. Typically, the EDA software tool synthesizes the abstract logic into a technology dependent netlist using a standard library from an IC manufacturer. The RTL can also describe the behavior of the circuits on the chip, as well as the interconnections to inputs and outputs.

After completion of the logic design phase, the IC undergoes a physical design phase or layout. The layout phase creates a semiconductor chip design from the RTL design and a library of available logic gates, and includes determining which logic gates to use, defining locations for the logic gates and interconnecting them. The layout phase includes one or more of a number of steps, including the floorplan stage, placement and routing, Power Performance Area (PPA) violation determination, design rule manual/design rule change violation determination and layout versus schematic. The layout phase may include a number of iterations in order to meet these various design constraints (i.e., PPA, DRC, and similar constraints).

FIG. 1 is a flow chart of a method 100 of designing a semiconductor device in accordance with one or more embodiments. Method 100 begins with operation 102 in which at least a both design rule manual (DRM) file, a design rule check (DRC) file or a layout editor file are loaded into an EDA tool.

In some embodiments, a DRM is a file that includes one or more design rules including constraints followed by integrated circuit designers during the design of an integrated circuit. In some embodiments, one or more design rules are a series of parameters used by semiconductor manufacturers that enable the circuit designer to verify the correctness of a mask set. In some embodiments, one or more design rules specify geometric and connectivity restrictions to ensure sufficient margins to account for variability in the semiconductor manufacturing process. In some embodiments, one or more design rules and the corresponding DRM are specific to a particular semiconductor manufacturing process. For example, in the design of a 65 nanometer (nm) semiconductor device, a particular DRM is associated with the 65 nanometer (nm) semiconductor device or process. For example, in the design of a 45 nanometer (nm) semiconductor device, another DRM is associated with the 45 nanometer (nm) semiconductor device or process. In some embodiments, the DRM is used to maintain sufficient spacing between features in the layout so that the layout is precisely formable during the fabrication process. In some embodiments, the tool used to generate the layout is also used to generate the DRM. In some embodiments, the DRM is generated by a separate tool than the layout tool. In some embodiments, the DRM is generated after generation of the layout. In some embodiments, the DRM includes one or more files of data.

In some embodiments, a DRC is a file that includes one or more design rule checks followed by integrated circuit designers during the design of an integrated circuit. In some embodiments, each of the one or more design rules is associated with a corresponding member of the one or more design rule checks. In some embodiments, a design rule check is an implementation by the EDA tool which determines whether a particular design complies with the corresponding design rule contained in the DRM. In some embodiments, a design rule check is a verification performed by the EDA tool which determines whether a particular design complies with the corresponding design rule contained in the DRM. In some embodiments, the DRC is performed during generation of the layout. In some embodiments, the DRC is used to maintain sufficient spacing between features in the layout so that the layout is precisely formable during a fabrication process. In some embodiments, the tool used to generate the layout is also used to perform the DRC. In some embodiments, the DRC is performed by a separate tool following generation of the layout. In some embodiments, the DRC includes one or more files of data.

In some embodiments, a layout editor includes one or more files used by the EDA tool to edit the layout of a particular integrated circuit design. In some embodiments, the layout editor is generated by the EDA tool. In some embodiments, the layout editor is generated by a different tool than the EDA, but is used by the EDA tool.

In operation 104, a relevant information is received by the EDA tool. In some embodiments, the relevant information comprises layer information of the semiconductor device or one or more selected features of the semiconductor device. In some embodiments, the layer information comprises a specific layer number of the semiconductor device. In some embodiments, the selected feature comprises one or more displayed features associated with a portion of the semiconductor device or one or more drawing features associated with a drawing illustrating the portion of the semiconductor device. In some embodiments, the one or more displayed features comprise layer information, semiconductor characteristics, shape information, a selected DRM or a selected DRC. In some embodiments, a selected DRM is one or more entries contained in the condensed DRM selected by the user. In some embodiments, a selected DRC is one or more entries contained in the condensed DRC selected by the user. In some embodiments, each selected design rule in the selected DRM is associated with a corresponding design rule check in the selected DRC. In some embodiments, the one or more drawing features comprise dimensions of the drawing, minimum lengths of the drawing, minimum widths of the drawing, minimum distances between a first region of the drawing and a second region of the drawing, minimum spacing of one or more shapes, minimum area of one or more shapes or enclosure rules.

In operation 106, a condensed DRM is created from the DRM. In some embodiments, the condensed DRM is a portion of the DRM for each of the design rule constraints associated with the relevant information. In some embodiments, the condensed DRM is a filtered version of the DRM based upon the relevant information. In some embodiments, the condensed DRM is a portion of the DRM for each of the design rule constraints associated with a specific layer number. In some embodiments, the condensed DRM comprises a portion of the DRM for each of the design rule constraints associated with the displayed features or drawing features of the semiconductor device.

In operation 108, a condensed DRC is created from the DRC. In some embodiments, the condensed DRC is a portion of the DRC for each of the design rule checks associated with the relevant information. In some embodiments, the condensed DRC is a filtered version of the DRC based upon the relevant information. In some embodiments, the condensed DRC is a portion of the DRC for each of the design rule constraints associated with a specific layer number. In some embodiments, the condensed DRC comprises a portion of the DRC for each of the design rule constraints associated with the displayed features or drawing features of the semiconductor device.

Figure 4A:
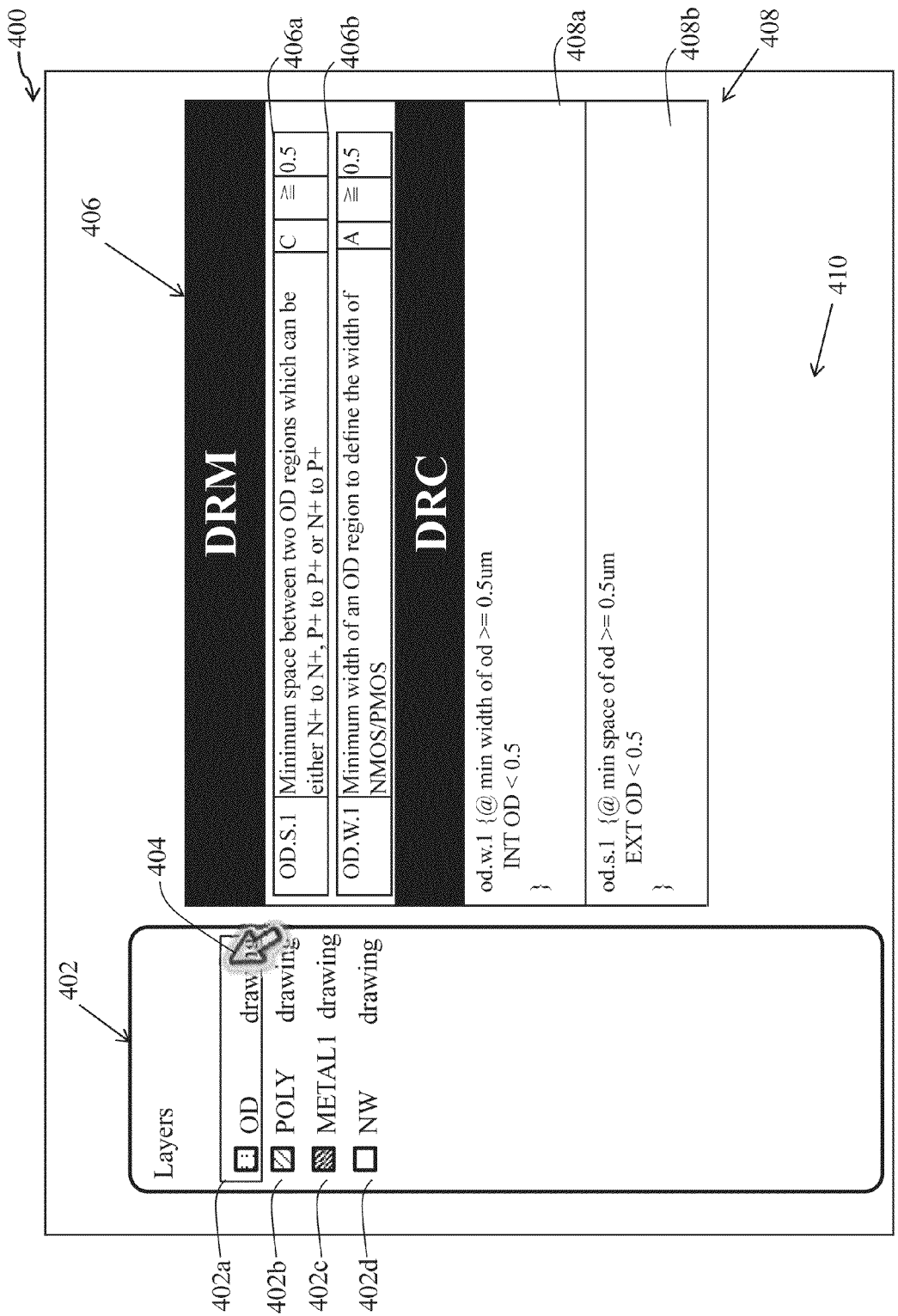
FIG. 4A is a schematic view of a user interface in accordance with one or more embodiments.
Figure 4B:
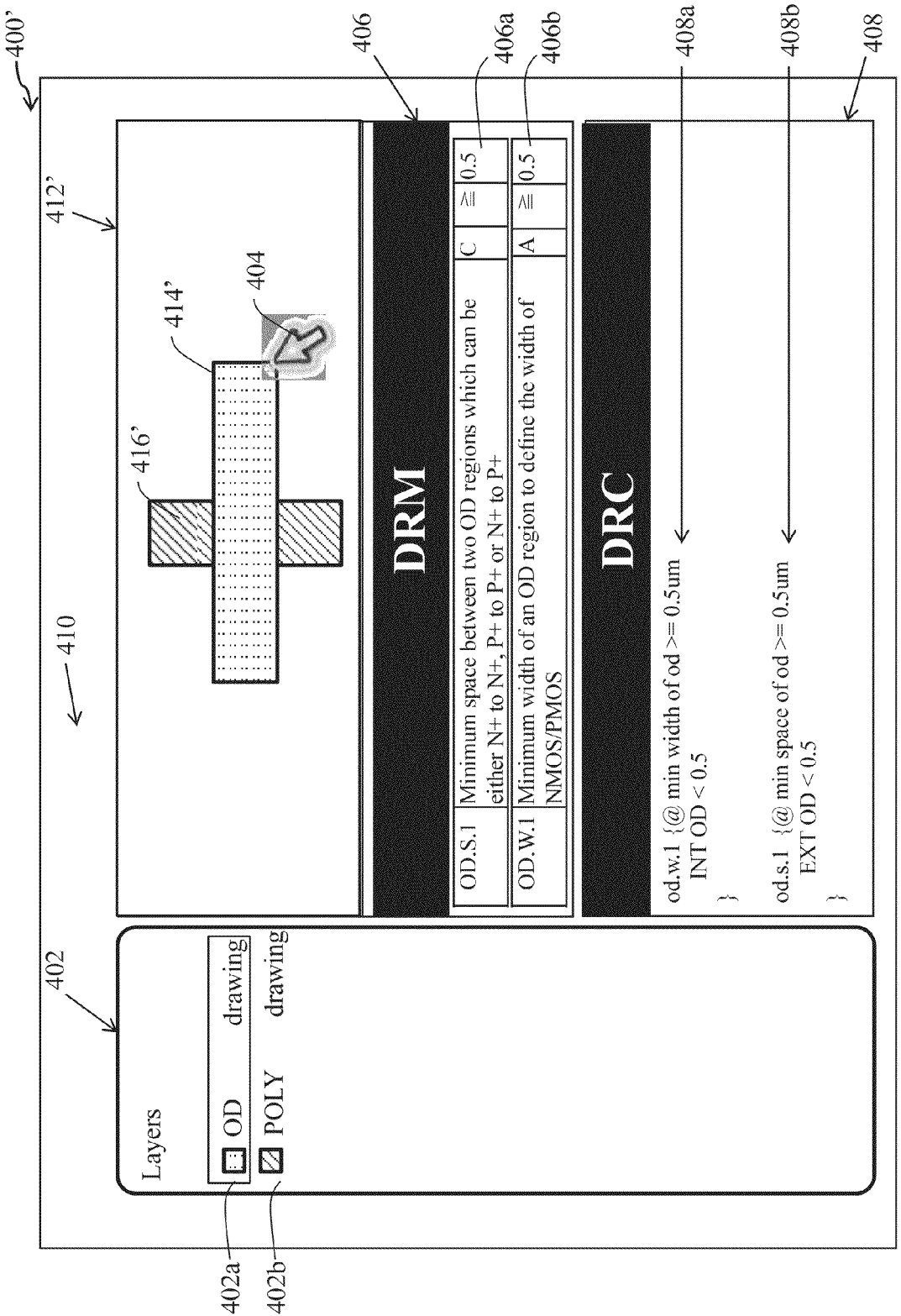
FIG. 4B is a schematic view of a user interface in accordance with one or more embodiments.

In operation 110, the condensed DRM or the condensed DRC is displayed by the user interface (such as the one shown as interface 400 and 400' in FIGS. 4A-B). In some embodiments, the user interface is a computer interface configured to display or control the method 100 of designing a semiconductor device. In some embodiments, the user interface is configured to receive the relevant information. In some embodiments, the user interface is configured to receive the relevant information from a user. In some embodiments, the user interface is also configured to receive user inputs to adjust the relevant information of the semiconductor device.

In operation 112, the system for designing a semiconductor device determines if a DRC is to be performed on the one or more selected features. If the system for designing a semiconductor device determines a DRC is not to be performed, the operation proceeds to operation 104. If the system for designing a semiconductor device determines to perform a DRC, the operation proceeds to operation 114.

In operation 114, a DRC is performed on the selected feature. In some embodiments, the DRC is configured to perform a design rule check for the selected feature selected by the user. In some embodiments, the DRC includes execution of the design rules associated with the selected feature selected by the user. In some embodiments, if the selected feature received from the user corresponds to a selected DRC, then a DRC is performed for the rules in the selected DRC that are associated with the selected rules in the DRM. In some embodiments, if the selected feature received from the user corresponds to a selected DRM, then a DRC is performed for the rules in the selected DRC that are associated with the selected rules in the DRM. In some embodiments, the selected DRM includes one or more selected design rules in the condensed DRM. In some embodiments, the selected DRC includes one or more selected design rule checks in the condensed DRC. In some embodiments, each of the one or more selected design rules in the selected DRM is associated with a corresponding member of the one or more design rule checks in the selected DRC. In some embodiments, after operation 114, the DRC results are displayed to the user by the user interface 400 or 400'.

Figure 2:
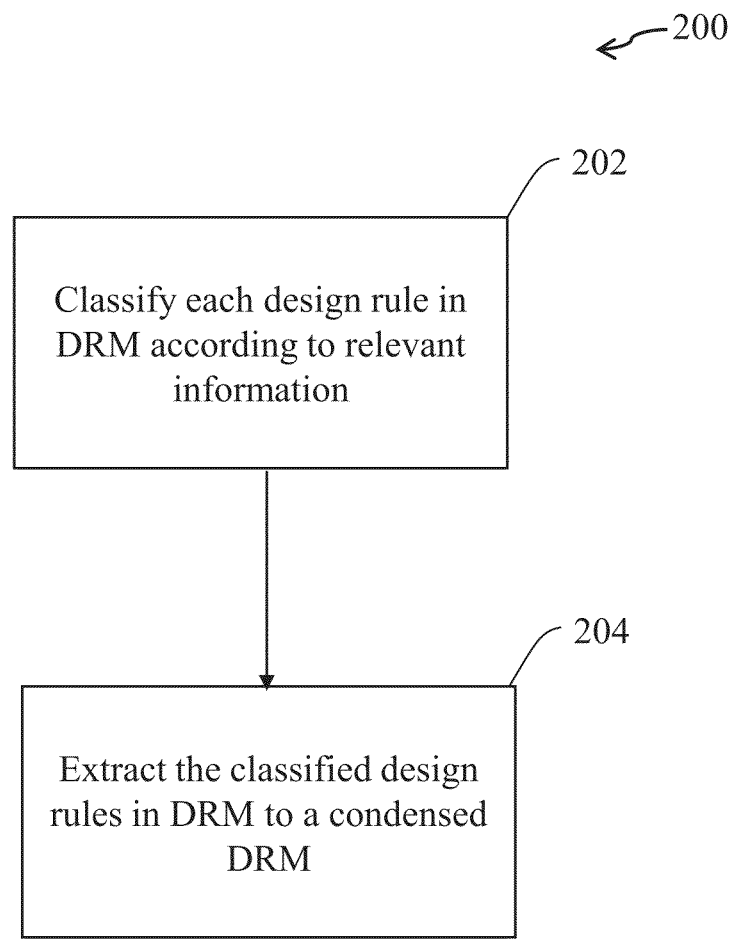
FIG. 2 is a flow chart of a method of designing a semiconductor device in accordance with one or more embodiments.

FIG. 2 is a flow chart of a method 200 of designing a semiconductor device in accordance with one or more embodiments. Method 200 is an embodiment of operation 106 shown in FIG. 1. Method 200 begins with operation 202, in which each of the design rules in the DRM are classified according to the relevant information. In some embodiments, each of the design rules in the DRM is classified according to the layer number. In some embodiments, each of the design rules in the DRM is classified according to the selected feature of the semiconductor device. In some embodiments, each of the design rules in the DRM are classified according to the one or more displayed features associated with a portion of the semiconductor device (e.g., as discussed in operation 104). In some embodiments, each of the design rules in the DRM are classified according to the one or more drawing features associated with a drawing portion of the semiconductor device (e.g., as discussed in operation 104).

In operation 204, the classified design rules in the DRM are extracted to the condensed DRM.

Figure 3:
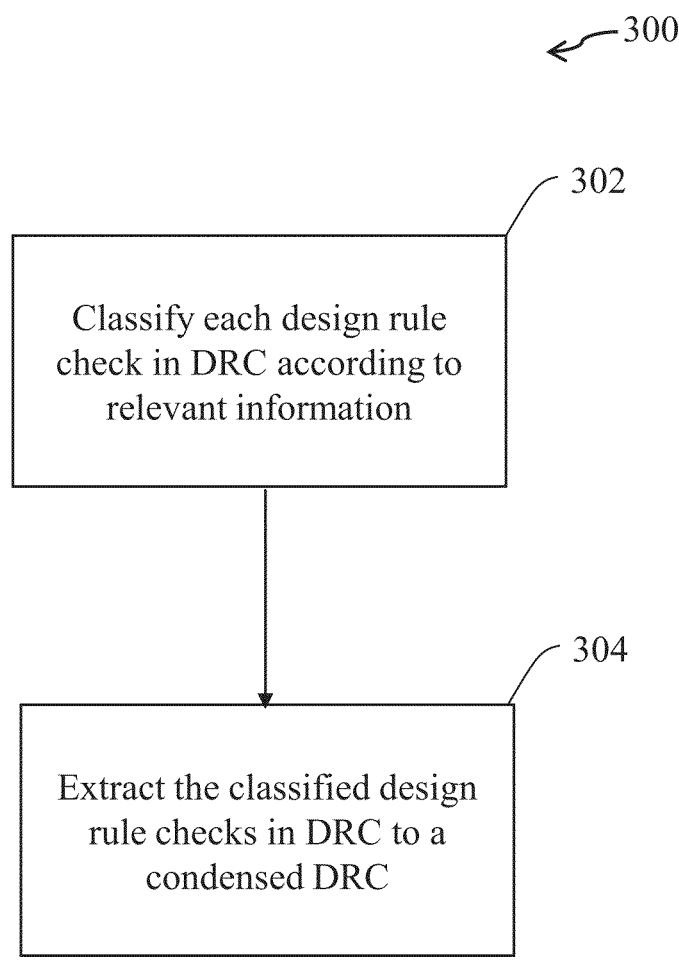
FIG. 3 is a flow chart of a method of designing a semiconductor device in accordance with one or more embodiments.

FIG. 3 is a flow chart of a method 300 of designing a semiconductor device in accordance with one or more embodiments. Method 300 is an embodiment of operation 108 shown in FIG. 1. Method 300 begins with operation 302, in which each of the design rule checks in the DRC are classified according to the relevant information. In some embodiments, each of the design rule checks in the DRC are classified according to the layer number. In some embodiments, each of the design rule checks in the DRC are classified according to the selected feature of the semiconductor device. In some embodiments, each of the design rule checks in the DRC are classified according to the one or more displayed features associated with a portion of the semiconductor device (e.g., as discussed in operation 104). In some embodiments, each of the design rule checks in the DRC are classified according to the one or more drawing features associated with a drawing portion of the semiconductor device (e.g., as discussed in operation 104).

In operation 304, the classified design rule checks in the DRC are extracted to the condensed DRC.

FIG. 4A is a schematic view of a user interface 400 in accordance with one or more embodiments. In some embodiments, user interface 400 is a user interface displayed by method 100 or 500. In some embodiments, user interface 400 is configured to receive data from a user. In some embodiments, user interface 400 is configured to display data of the semiconductor device. User interface 400 comprises a layer field 402, a cursor 404, a DRM field 406, a DRC field 408 and an open region 410.

Layer field 402 is an area of the user interface 400, where a user selects relevant information of the semiconductor device. In some embodiments, the relevant information of FIG. 4A comprises the relevant information previously described in method 100 of FIG. 1. In some embodiments, the layer field 402 includes one or more layers contained in the semiconductor device. In some embodiments, the layer field 402 includes the different elements contained in an individual layer of the semiconductor device. In some embodiments, the layer field 402 displays some or all of the elements contained in a particular layer of the semiconductor device and the corresponding condensed DRM or condensed DRC associated with each element within the particular layer. In some embodiments, the layer field 402 comprises OD layer field 402a, POLY layer field 402b, METAL1 layer field 402c and NW layer field 402d. In some embodiments, OD layer field 402a is an oxide definition portion within the semiconductor device. In some embodiments, POLY layer field 402b is a polysilicon portion within the semiconductor device. In some embodiments, METAL1 layer field 402c is a metal layer portion within the semiconductor device. In some embodiments, NW layer field 402d is an N-Well portion within the semiconductor device. In some embodiments, METAL1 layer field 402c displays the elements contained in the METAL1 layer of the semiconductor device, and if the user selects the METAL1 layer field 402c with cursor 404, then the corresponding condensed DRM associated with the METAL1 layer are displayed in the corresponding DRM field 406 or the corresponding condensed DRC associated with the METAL1 layer are displayed in the corresponding DRC field 408.

Cursor 404 is a cursor configured to select relevant information displayed on the user interface 400.

DRM field 406 is an area of the user interface 400 which displays one or more of the design rules contained in the condensed DRM (e.g., as described in FIG. 1). In some embodiments, the DRM field 406 is classified by the relevant information previously described in FIG. 1. In some embodiments, DRM field 406 is configured to be selected by a user (e.g., by cursor 404) to select one or more condensed DRM entries. In some embodiments, if the DRM field 406 is selected, then the corresponding DRC associated with the selected DRM is displayed in DRC field 408.

DRM field 406 comprises OD space DRM field 406a and OD width DRM field 406b. In some embodiments, OD space DRM field 406a is a design rule where the minimum space between regions of the semiconductor device is greater than or equal to 0.5 nm. In some embodiments, OD space DRM field 406a is associated with the corresponding OD space DRC field 408a. In some embodiments, if the user selects the OD space DRM field 406a, then the corresponding DRC associated with the OD space DRM field 406a (for example, OD space DRC field 408a) is displayed in DRC field 408. In some embodiments, OD width DRM field 406b is a design rule where the minimum width of an OD region of the semiconductor device is greater than or equal to 0.5 nm. In some embodiments, the OD width DRM field 406b is associated with the corresponding OD width DRC field 408b. In some embodiments, if the user selects the OD width DRM field 406b, then the corresponding DRC associated with the OD width DRM field 406b (for example, OD width DRC field 408b) is displayed in DRC field 408. In some embodiments, if the OD space DRM field 406a is selected in order to perform a DRC (e.g., as described in operation 114 of FIG. 1) of the selected field, then the design rule checks contained in the corresponding OD space DRC field 408a are used to perform the DRC.

DRC field 408 comprises OD space DRM field 408a and OD width DRM field 408b. In some embodiments, OD space DRC field 408a is a design rule check where the minimum space between regions of the semiconductor device is greater than or equal to 0.5 nm. In some embodiments, OD space DRC field 408a is associated with the corresponding OD space DRM field 406a. In some embodiments, if the user selects the OD space DRC field 408a, then the corresponding DRM associated with the OD space DRC field 408a (for example, OD space DRM field 406a) is displayed in DRM field 406. In some embodiments, OD width DRC field 408b is a design rule check where the minimum width of an OD region of the semiconductor device is greater than or equal to 0.5 nm. In some embodiments, the OD width DRC field 408b is associated with the corresponding OD width DRM field 406b. In some embodiments, if the user selects the OD width DRC field 408b, then the corresponding DRM associated with the OD width DRC field 408b (for example, OD width DRM field 406b) is displayed in DRM field 406. In some embodiments, if the OD space DRC field 408a is selected in order to perform a DRC (as described in operation 114 of FIG. 1) of the selected field, then the design rule checks contained in the OD space DRC field 408a are used to perform the DRC.

Open region 410 is an area of the user interface 400. In some embodiments, the open region 410 is an unoccupied or open area of the user interface 400. In some embodiments, the open region 410 is occupied by one or more of the data contained in method 100 of FIG. 1.

FIG. 4B is a schematic view of a user interface 400' in accordance with one or more embodiments. In some embodiments, user interface 400' is a user interface displayed by method 100 or 500. User interface 400' is an embodiment of the user interface 400 shown in FIG. 4A. As shown in FIG. 4B, similar elements have a same reference number as shown in FIG. 4A. In comparison with user interface 400, user interface 400' also includes a drawing region 412', a first object 414' and a second object 416'.

Drawing region 412' is an area of the user interface 400 which displays one or more drawing objects (for example, first object 414' or second object 416'). In some embodiments, a drawing object is a graphical illustration of an element of the semiconductor device. In some embodiments, the drawing object is an OD layer, a POLY layer, a METAL1 layer or a NW layer. In some embodiments, the user of the EDA tool interacts with a drawing object (e.g., by cursor 404) in order to change one or more properties associated with each drawing object. In some embodiments, the drawing region comprises first object 414' and second object 416'.

First object 414' is a first drawing object contained in the drawing region 412' of user interface 400'. In some embodiments, first object 414' is an OD drawing object. In some embodiments, first object 414' is associated with one or more of OD layer field 402a, OD space DRM field 406a, OD width DRM field 406b, OD space DRM field 408a or OD width DRM field 408b. In some embodiments, if the first object 414' is selected by the user with cursor 404, then the corresponding layer field 402 associated with the first object 414', the corresponding DRM field 406 associated with the first object 414' or the corresponding DRC field 408 associated with the first object 414' are displayed. In some embodiments, the user of the EDA tool interacts with the first object 414' (e.g., by cursor 404) in order to change one or more of layer field 402, DRM field 406 or DRC field 408 associated with each drawing object.

Second object 416' is a second drawing object contained in the drawing region 412' of user interface 400'. In some embodiments, second object 416' is a POLY drawing object. In some embodiments, second object 416' is associated with one or more of POLY layer fields 402b. In some embodiments, if the second object 416' is selected by the user with cursor 404, then the corresponding layer field 402 associated with the second object 416', the corresponding DRM field 406 associated with the second object 416' or the corresponding DRC field 408 associated with the second object 416' are displayed. In some embodiments, the user of the EDA tool interacts with the second object 416' (e.g., by cursor 404) in order to change one or more of layer field 402, DRM field 406 or DRC field 408 associated with each drawing object.

Figure 5:
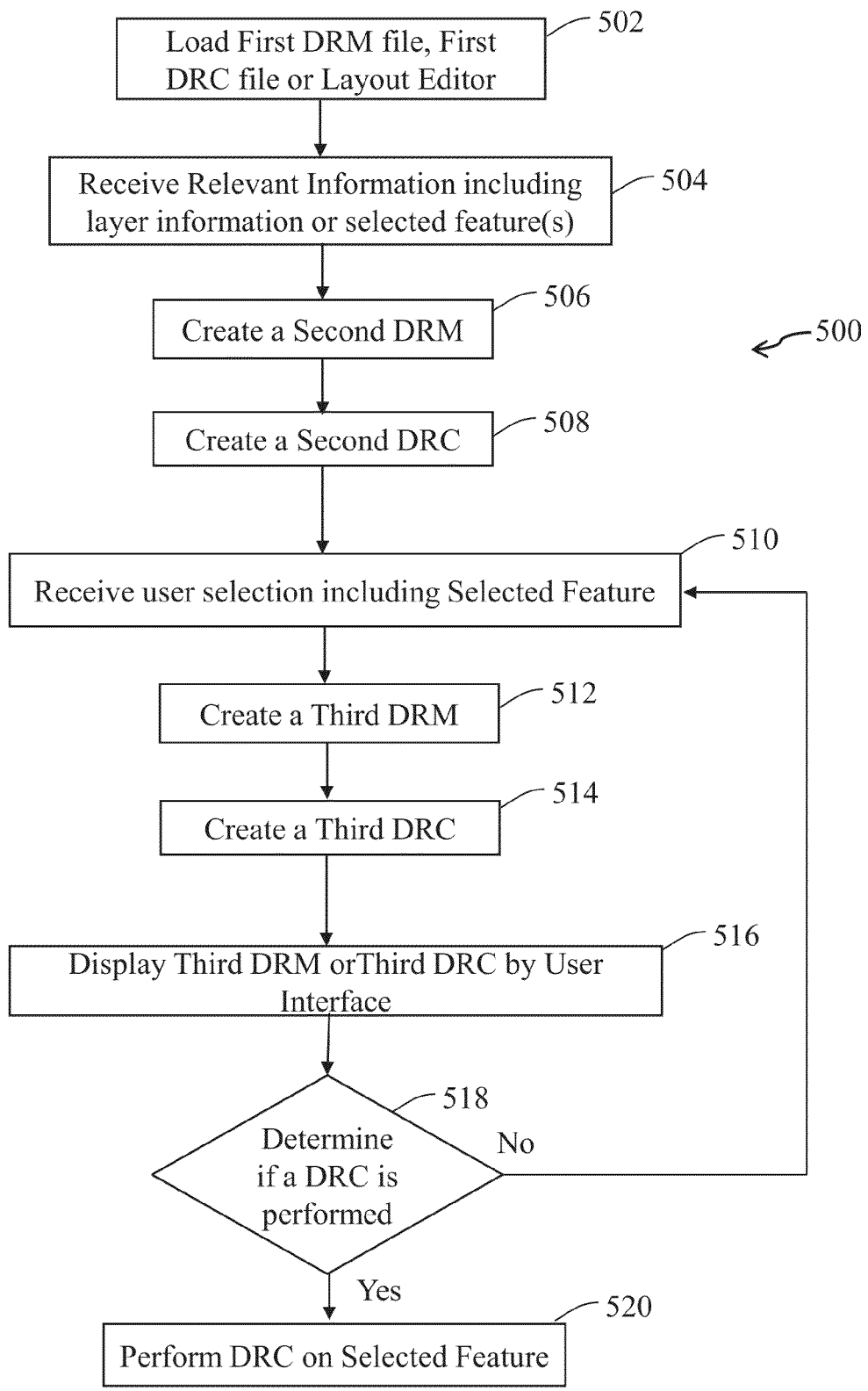
FIG. 5 is a flow chart of a method of designing a semiconductor device in accordance with one or more embodiments.

FIG. 5 is a flow chart of a method 500 of designing a semiconductor device in accordance with one or more embodiments. Method 500 is an embodiment of method 100 shown in FIG. 1.

Method 500 begins with operation 502 in which at least a first design rule manual (DRM) file, a first design rule check (DRC) file or a layout editor file are loaded into an EDA tool. Operation 502 is an embodiment of operation 102 shown in FIG. 1. First DRM file is an embodiment of the DRM file in FIG. 1 and first DRC file is an embodiment of the DRC file in FIG. 1.

In operation 504, a relevant information is received from a user of the EDA tool. Operation 504 is an embodiment of operation 104 shown in FIG. 1. The relevant information of FIG. 5 is an embodiment of the relevant information of FIG. 1. In some embodiments, relevant information comprises the layer information of the semiconductor device or a selected feature of the semiconductor device.

In operation 506, a second DRM is created from the first DRM. In some embodiments, the second DRM is a portion of the first DRM for each of the design rule constraints associated with the relevant information. In some embodiments, the second DRM is a filtered version of the first DRM based upon relevant information. In some embodiments, the second DRM is a portion of the first DRM for each of the design rule constraints associated with a specific layer number. In some embodiments, the second DRM comprises a portion of the first DRM for each of the design rule constraints associated with the displayed features or drawing features of the semiconductor device. In some embodiments, the second DRM is created from the first DRM by classifying each of the design rules in the first DRM according to the layer number and extracting the classified design rules in the first DRM to the second DRM.

In operation 508, a second DRC is created from the first DRC. In some embodiments, the second DRC is a portion of the first DRC for each of the design rule checks associated with the relevant information. In some embodiments, the second DRC is a filtered version of the first DRC based upon relevant information. In some embodiments, the second DRC is a portion of the first DRC for each of the design rule constraints associated with a specific layer number. In some embodiments, the second DRC comprises a portion of the first DRC for each of the design rule constraints associated with the displayed features or drawing features of the semiconductor device. In some embodiments, the second DRC is created from the first DRC by classifying each of the design rule checks in the first DRM according to the layer number and extracting the classified design rule checks in the first DRM to the second DRM.

In operation 510, a user selection is received from a user of the EDA tool. In some embodiments, the user selection comprises a selected feature of the semiconductor device. In some embodiments, the selected feature comprises one or more displayed features associated with a portion of the semiconductor device or one or more drawing features associated with a drawing illustrating the portion of the semiconductor device. In some embodiments, the one or more displayed features comprise layer information, semiconductor characteristics, shape information, a selected DRM or a selected DRC. In some embodiments, a selected DRM is one or more entries contained in the second DRM selected by the user. In some embodiments, a selected DRC is one or more entries contained in the second DRC selected by the user. In some embodiments, each selected design rule in the selected DRM is associated with a corresponding design rule check in the selected DRC. In some embodiments, the one or more drawing features comprise dimensions of the drawing, minimum lengths of the drawing, minimum widths of the drawing, minimum distances between a first region of the drawing and a second region of the drawing, minimum spacing of one or more shapes, minimum area of one or more shapes or enclosure rules.

In operation 512, a third DRM is created from the second DRM. In some embodiments, the third DRM is a portion of the second DRM for each of the design rule constraints associated with the user selection. In some embodiments, the third DRM is a filtered version of the second DRM based upon the user selection information. In some embodiments, the third DRM is a portion of the second DRM for each of the design rule constraints associated with the displayed features or drawing features of the semiconductor device for a specific layer number of the semiconductor device. In some embodiments, the third DRM is created from the second DRM by classifying each of the design rules in the second DRM according to the user selection and extracting the classified design rules in the second DRM to the third DRM.

In operation 514, a third DRC is created from the second DRC. In some embodiments, the third DRC is a portion of the second DRC for each of the design rule checks associated with the user selection. In some embodiments, the third DRC is a filtered version of the second DRC based upon the user selection information. In some embodiments, the third DRC is a portion of the second DRC for each of the design rule constraints associated with the displayed features or drawing features of the semiconductor device for a specific layer number of the semiconductor device. In some embodiments, the third DRC is created from the second DRC by classifying each of the design rule checks in the second DRC according to the user selection and extracting the classified design rule checks in the second DRC to the third DRC.

In operation 516, the third DRM or the third DRC is displayed by the user interface (such as the shown as interface 400 and 400' in FIGS. 4A-B). In some embodiments, the user interface is a computer interface configured to display or control the method 500 of designing a semiconductor device. In some embodiments, the user interface is configured to receive the relevant information from the user. In some embodiments, the user interface is also configured to receive user inputs to adjust the relevant information of the semiconductor device. In some embodiments, the user inputs comprise a selection received from a user.

In operation 518, the system for designing a semiconductor device determines if a DRC is to be performed on the one or more selected features. If the system for designing a semiconductor device determines a DRC is not to be performed, the operation proceeds to operation 510. If the system for designing a semiconductor device determines to perform a DRC, the operation proceeds to operation 520.

In operation 520, a DRC is performed for the one or more selected features received from the user. In some embodiments, the DRC is configured to perform a design rule check for the user selection. In some embodiments, the DRC includes execution of the one or more design rules associated with the user selection. In some embodiments, if the user selection corresponds to a selected DRC, then the DRC is performed for the selected rules in the selected DRC. In some embodiments, if the user selection corresponds to a selected DRM, then a DRC is performed for the selected rules in the selected DRC that are associated with the selected rules in the DRM. In some embodiments, the selected DRM includes one or more selected design rules in the third DRM. In some embodiments, the selected DRC includes one or more selected design rule checks in the third DRC. In some embodiments, each of the one or more selected design rules in the selected DRM is associated with a corresponding member of the one or more design rule checks in the selected DRC. In some embodiments, after operation 520, the DRC results are displayed to the user by the user interface 400 or 400'.

Figure 6:
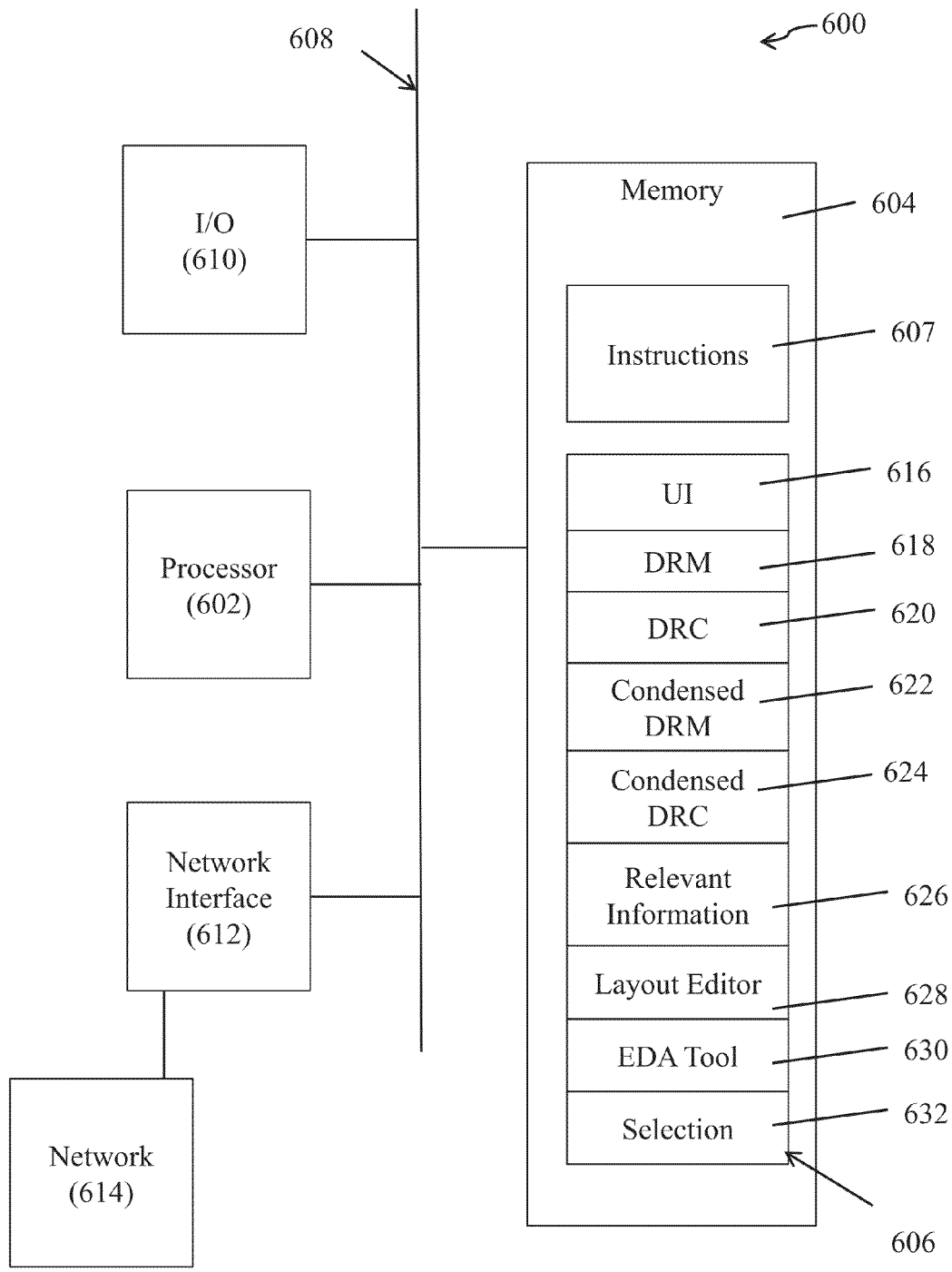
FIG. 6 is a block diagram of a control system for implementing a method in accordance with one or more embodiments.

FIG. 6 is a block diagram of a control system 600 for designing a semiconductor device in accordance with one or more embodiments. In some embodiments, the control system 600 is a general purpose computing device which implements method 100 of FIG. 1 or method 500 of FIG. 5 in accordance with one or more embodiments. Control system 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with manufacturing machines for producing the semiconductor device. The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described e.g., in method 100 or 500.

In one or more embodiments, the processor 602 is a central processing unit (CPU), a multi-processor, a distributed processing system, an application specific integrated circuit (ASIC), and/or a suitable processing unit.

In one or more embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 604 includes a compact disk-read only memory (CD-ROM), a compact disk-read/write (CD-R/W), and/or a digital video disc (DVD).

In one or more embodiments, the storage medium 604 stores the computer program code 606 configured to cause system 600 to perform method 100 or method 500. In one or more embodiments, the storage medium 604 also stores information needed for performing method 100 or 500 as well as information generated during performing method 100 or 500, such as user interface (UI) 616, DRM 618, DRC 620, Condensed DRM 622, Condensed DRC 624, Relevant Information 626, Layout Editor 628, EDA Tool 630, and/or a set of executable instructions to perform the operation of method 100 or 500. In some embodiments, UI 616 is a graphical user interface (GUI).

In one or more embodiments, the storage medium 604 stores instructions 607 for interfacing with external machines. The instructions 607 enable processor 602 to generate instructions readable by the external machines to effectively implement method 100 or 500 during a design process. In some embodiments, the design process is of a semiconductor device including one or more circuit elements.

Control system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Control system 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1394. In one or more embodiments, method 100 or 500 are implemented in two or more systems 600, and information such as UI 616, DRM 618, DRC 620, Condensed DRM 622, Condensed DRC 624, Relevant Information 626, Layout Editor 628, EDA Tool 630 are exchanged between different systems 600 via network 614.

System 600 is configured to receive information related to a UI through I/O interface 610. The information is transferred to processor 602 via bus 608 to generate UI. The UI is then stored in computer readable medium 604 as UI 616. Control system 600 is configured to receive information related to a DRM through I/O interface 610. The information is stored in computer readable medium 604 as DRM 618. Control system 600 is configured to receive information related to a DRC through I/O interface 610. The information is stored in computer readable medium 604 as DRC 620. Control system 600 is configured to receive information related to a condensed DRM through I/O interface 610. The information is stored in computer readable medium 604 as condensed DRM 622. Control system 600 is configured to receive information related to a condensed DRC through I/O interface 610. The information is stored in computer readable medium 604 as condensed DRC 624. Control system 600 is configured to receive information related to a Relevant Information through I/O interface 610. The information is stored in computer readable medium 604 as Relevant Information 626. Control system 600 is configured to receive information related to a Layout Editor through I/O interface 610. The information is stored in computer readable medium 604 as Layout Editor 628. Control system 600 is configured to receive information related to an EDA Tool through I/O interface 610. The information is stored in computer readable medium 604 as EDA Tool 630. Control system 600 is configured to receive information related to a selection through I/O interface 610. The information is stored in computer readable medium 604 as selection 632.

In some embodiments, the implementation shown in FIGS. 1-6 provides an integrated development environment for designing a semiconductor device. In some embodiments, the implementation shown in FIGS. 1-6 displays a DRC or DRM associated with specific features or properties of a semiconductor device and provides flexible interaction with the displayed DRM or DRC. In some embodiments, the displayed DRC or DRM are the DRC or DRM associated with the entire process of a specific semiconductor device. In some embodiments, the displayed DRC or DRM are the DRC or DRM associated with specific portions of the semiconductor device process. In some embodiments, the displayed DRC or DRM are the DRC or DRM associated with a specific layer or feature of the semiconductor device process. In some embodiments, the implementation shown in FIGS. 1-6 can be compiled dynamically for the displayed DRC or DRM associated with a specific layer or feature of the semiconductor device process. In some embodiments, the displayed DRC or DRM are a layer-by-layer DRC or DRM associated with a specific semiconductor process. In some embodiments, the method 100 or 500 is implemented as a standalone software application. In some embodiments, the method 100 or 500 is implemented as a software application that is a part of an additional software application. In some embodiments, the method 100 or 500 is implemented as a plug-in to a software application. In some embodiments, the method 100 or 500 is implemented as a software application that is a portion of the EDA tool. In some embodiments, the method 100 or 500 is implemented as a software application that is used by an EDA tool. In some embodiments, the EDA tool is used to generate a layout of the semiconductor device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, a same tool used to generate the layout is used to perform the DRC. In some embodiments, the DRC is performed by a separate tool following generation of the layout. In some embodiments, a DRC is performed during generation of the layout. In some embodiments, a DRC is performed after generation of the layout.

One of ordinary skill in the art would recognize that an order of operations in method 100 or 500 is adjustable. One of ordinary skill in the art would further recognize that additional steps are able to be included in method 100 or 500 without departing from the scope of this description.

One aspect of this description relates to a method of making a semiconductor device including a system for designing a semiconductor device, comprising at least one processor, and at least one memory including computer program code for one or more programs, the at least one memory and the computer program code being configured to, with the at least one processor, cause the system to load a design rule manual (DRM) and a design rule check (DRC) into an electronic design tool, where the DRM comprises one or more design rules, and the DRC comprises one or more design rule checks. Each design rule check of the one or more design rule checks is both associated with a corresponding design rule of the one or more design rules and configured to verify compliance with the corresponding design rule. The at least one memory and the computer program code are configured to cause the system to receive a relevant information, create a condensed DRM from the DRM, create a condensed DRC from the DRC, display at least the condensed DRM or the condensed DRC and perform a DRC for the condensed DRC or the condensed DRM. The condensed DRM is a portion of the DRM for each of the design rules associated with the relevant information and the condensed DRC is a portion of the DRC for each of the design rule checks associated with the relevant information. Further, the relevant information comprises a layer number of the semiconductor device or a selected feature of the semiconductor device.

Another aspect of this description relates to a computer readable medium comprising computer executable instructions for carrying out a method for designing a semiconductor device. The method comprising loading a first design rule manual (DRM) and a first design rule check (DRC) into a design tool, where the first DRM comprises one or more design rules and the first DRC comprises one or more design rule checks. Also, each design rule check of the one or more design rule checks is both associated with a corresponding design rule of the one or more design rules and configured to verify compliance with the corresponding design rule. The method also comprises receiving a layer information, creating a second DRM from the first DRM, creating a second DRC from the first DRC, receiving a user selection, creating a third DRM from the second DRM, creating a third DRC from the second DRC and displaying at least the third DRM or the third DRC. The second DRM includes at least a portion of the first DRM for each of the design rules associated with the layer number and the second DRC includes at least a portion of the first DRC for each of the design rule checks associated with the layer number. The user selection comprises a selected feature of the semiconductor device. Further, the third DRM includes at least a portion of the second DRM for each of the design rules associated with the selected feature and the third DRC includes at least a portion of the second DRC for each of the design rule checks associated with the selected feature. The layer information comprises a layer number of the semiconductor device.

Still another aspect of this description relates to a method for designing a semiconductor device, the method comprising loading a design rule manual (DRM) and a design rule check (DRC) into an electronic design tool, where the DRM comprises one or more design rules and the DRC comprises one or more design rule checks. Each design rule check of the one or more design rule checks is both associated with a corresponding design rule of the one or more design rules and configured to verify compliance with the corresponding design rule. The method also comprises receiving relevant information, creating, by a processor, a condensed DRM from the DRM, creating a condensed DRC from the DRC and displaying at least the condensed DRM or the condensed DRC by a user interface. The relevant information comprises a layer number of the semiconductor device or a selected feature of the semiconductor device. Further, the condensed DRM is a portion of the DRM for each of the design rules associated with the relevant information and the condensed DRC is a portion of the DRC for each of the design rule checks associated with the relevant information.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system for designing a semiconductor device, comprising:
    at least one processor; and
    at least one memory including computer program code for one or more programs, the at least one memory and the computer program code being configured to, with the at least one processor, cause the system to:
    load a design rule manual (DRM) and a design rule check (DRC) into an electronic design tool, wherein:
        the DRM comprises one or more design rules; and
        the DRC comprises one or more design rule checks, wherein each design rule check of the one or more design rule checks is both associated with a corresponding design rule of the one or more design rules and configured to verify compliance with the corresponding design rule;
    receive relevant information, wherein the relevant information comprises a layer number of the semiconductor device or a selected feature of the semiconductor device;
    create a condensed DRM from the DRM, wherein the condensed DRM comprises a portion of the DRM for each of the design rules associated with the relevant information;
    create a condensed DRC from the DRC, wherein the condensed DRC comprises a portion of the DRC for each of the design rule checks associated with the relevant information;
    display at least the condensed DRM or the condensed DRC; and
    perform a DRC for at least a portion of the condensed DRC or the condensed DRM.

2. The system of claim 1, wherein causing the system to create the condensed DRM from the DRM comprises causing the system to:
    classify each of the design rules in the DRM according to the relevant information; and
    extract the classified design rules in the DRM to the condensed DRM.

3. The system of claim 1, wherein causing the system to create the condensed DRC from the DRC comprises causing the system to:
    classify each of the design rule checks in the DRC according to the relevant information; and
    extract the classified design rule checks in the DRC to the condensed DRC.

4. The system of claim 1, wherein the selected feature comprises at least:
    one or more displayed features associated with a portion of the semiconductor device; or
    one or more drawing features associated with a drawing illustrating the portion of the semiconductor device.

5. The system of claim 4, wherein the drawing features comprise at least one member selected from:
    one or more dimensions of the drawing;
    one or more shapes of the drawing; or
    one or more distances between a first region of the drawing and a second region of the drawing.

6. The system of claim 1, wherein causing the system to perform a DRC for at least a portion of the condensed DRC comprises causing the system to:
    receive a selected DRC, wherein the selected DRC includes one or more design rule checks in the condensed DRC; and
    perform a DRC for the one or more design rule checks in the selected DRC.

7. The system of claim 1, wherein causing the system to perform a DRC for at least a portion of the condensed DRC comprises causing the system to:
    receive a selected DRM, wherein:
        the selected DRM includes one or more selected design rules in the condensed DRM;
        a selected DRC includes one or more selected design rule checks in the condensed DRC;
        each selected design rule in the selected DRM is associated with a corresponding design rule check in the selected DRC; and
    perform a DRC for the one or more design rule checks in the selected DRC.

8. The system of claim 1, wherein the condensed DRM and the condensed DRC are displayed by a user interface configured to receive the relevant information.

9. A non-transitory computer readable medium comprising computer executable instructions for carrying out a method for designing a semiconductor device, the method comprising:
    loading a first design rule manual (DRM) and a first design rule check (DRC) into a design tool, wherein:
        the first DRM comprises one or more design rules; and
        the first DRC comprises one or more design rule checks, wherein each design rule check of the one or more design rule checks is both associated with a corresponding design rule of the one or more design rules and configured to verify compliance with the corresponding design rule;
    receiving layer information, wherein the layer information comprises a layer number of the semiconductor device;
    creating a second DRM from the first DRM, wherein the second DRM includes at least a portion of the first DRM for each of the design rules associated with the layer number;
    creating a second DRC from the first DRC, wherein the second DRC includes at least a portion of the first DRC for each of the design rule checks associated with the layer number;
    receiving a user selection, wherein the user selection comprises a selected feature of the semiconductor device;
    creating a third DRM from the second DRM, wherein the third DRM includes at least a portion of the second DRM for each of the design rules associated with the selected feature;
    creating a third DRC from the second DRC, wherein the third DRC includes at least a portion of the second DRC for each of the design rule checks associated with the selected feature; and displaying at least the third DRM or the third DRC.

10. The non-transitory computer readable medium of claim 9, wherein creating the second DRM from the first DRM comprises:
    classifying each of the design rules in the first DRM according to the layer number; and
    extracting the classified design rules in the first DRM to the second DRM.

11. The non-transitory computer readable medium of claim 9, wherein creating the second DRC from the first DRC comprises:
    classifying each of the design rule checks in the first DRC according to the layer number; and
    extracting the classified design rule checks in the first DRC to the second DRC.

12. The non-transitory computer readable medium of claim 9, wherein creating the third DRM from the second DRM comprises:
    classifying each of the design rules in the second DRM according to the user selection; and
    extracting the classified design rules in the second DRM to the third DRM.

13. The non-transitory computer readable medium of claim 9, wherein creating the third DRC from the second DRC comprises:
    classifying each of the design rule checks in the second DRC according to the user selection; and
    extracting the classified design rule checks in the second DRC to the third DRC.

14. The non-transitory computer readable medium of claim 9, wherein the selected feature comprises at least:
    one or more displayed features associated with a portion of the semiconductor device; or
    one or more drawing features associated with a drawing illustrating the portion of the semiconductor device;
    one or more of the design rules contained in the third DRM; or
    one or more of the design rule checks contained in the third DRC.

15. The non-transitory computer readable medium of claim 14, wherein the drawing features comprise at least one member selected from:
    one or more dimensions of the drawing;
    one or more shapes of the drawing; or
    one or more distances between a first region and a second region of the drawing.

16. The non-transitory computer readable medium of claim 9, wherein the third DRM and the third DRC are displayed by a user interface configured to receive the selected feature.

17. A method of designing a semiconductor device, the method comprising:
    loading a design rule manual (DRM) and a design rule check (DRC) into an electronic design tool, wherein:
        the DRM comprises one or more design rules; and
        the DRC comprises one or more design rule checks, wherein each design rule check of the one or more design rule checks is both associated with a corresponding design rule of the one or more design rules and configured to verify compliance with the corresponding design rule;
    receiving relevant information, wherein the relevant information comprises a layer number of the semiconductor device or a selected feature of the semiconductor device;
    creating, by a processor, a condensed DRM from the DRM, wherein the condensed DRM comprises a portion of the DRM for each of the design rules associated with the relevant information;
    creating a condensed DRC from the DRC, wherein the condensed DRC comprises a portion of the DRC for each of the design rule checks associated with the relevant information; and
    displaying at least the condensed DRM or the condensed DRC by a user interface.

18. The method of claim 17, wherein creating the condensed DRM from the DRM comprises:
    classifying each of the design rules in the DRM according to the relevant information; and
    extracting the classified design rules in the DRM to the condensed DRM.

19. The method of claim 17, wherein creating the condensed DRC from the DRC comprises:
    classifying each of the design rule checks in the DRC according to the relevant information; and
    extracting the classified design rule checks in the DRC to the condensed DRC.

20. The method of claim 17, wherein the selected feature comprises at least:
    one or more displayed features associated with a portion of the semiconductor device; or
    one or more drawing features associated with a drawing illustrating the portion of the semiconductor device.

* * * * *